Patented Nov. 13, 1951

2,574,476

UNITED STATES PATENT OFFICE

2,574,476

ANTISEPTIC DENTAL PLATE ADHESIVE

Clifford J. Heath, Phoenix, Ariz., Carl A. Lawrence, Pinckney, Mich., and Hugo R. Kolar, Chicago, Ill., assignors to Consolidated Cosmetics, Chicago, Ill., a partnership No Drawing. Application August 22, 1950, Serial No. 180,898

2 Claims. (Cl. 106—207)

This invention relates to a dental plate adhesive which inhibits the growth of or kills bacteria and putrefaction of food and secretions lodged beneath the dental plate and aids in the control and prevention of odors emanating therefrom.

An object of the present invention is to provide an adhesive which is safe and effective, has no disagreeable taste or odor, is non-irritating, may be easily applied to the dentures and which dissolves by body temperature or due to the secretions in the mouth for an effective period of from 8 to 14 hours.

Another object of our invention is to supply a dental plate adhesive which has definite antiseptic properties and germicidal characteristics, and which will prevent the growth of organisms ordinarily found in the oral cavity, inhibit the growth of or kill bacteria thereby preventing the putrefaction of food under the dental plate, so as to act as a deodorant in controlling and preventing the emanation of odors from the mouth.

Our invention also comprises such other objects, advantages and capabilities as will later more fully appear and which are inherently possessed by our invention.

While we have shown herein preferred formulas, compositions and embodiments of our invention, yet it is to be understood that the same are susceptible of modification and change without departing from the spirit of our invention.

In the present invention, our composition acts not only as an adhesive but also as an antiseptic, germicide and deodorant.

In the ordinary use of removable dentures or dental plates, there is often an imperfect fit due to shrinkage of the gums or other reasons. Our composition, when applied to these dental plates, acts as an adhesive to form a satisfactory union. However, secretions and food in the mouth tend to lodge beneath the dental plates and bactericidal decomposition begins with the resultant generation of odors therefrom. The antiseptic properties of our composition act at once to aid in the control of these odors, by inhibiting the growth of or killing the organisms in the oral cavity. This promptly stops the putrefaction, and our composition acts in the double capacity of an effective deodorizer as well as a satisfactory adhesive.

Our composition consists of a suitable base with adhesive properties, an antiseptic and germicide resulting in deodorizing characteristics, an element for providing proper texture, consistency and viscosity and desired color and taste factors.

Our preferred formula is as follows:

| | Parts by weight |
|---|---|
| 8-hydroxyquinoline | 0.2 |
| Petrolatum U. S. P. | 36.0 |
| Mineral Oil U. S. P. | 12.5 |
| Harmless red color | 1.5 |
| Karaya gum | 48.8 |
| Flavor | (trace) |
| Total | 100.0 |

While we have shown the preferred use of .2 percent of 8-hydroxyquinoline, yet we may use as low as .033 percent and as high as 3 percent per total of 100 percent of the composition.

We may also use instead of 8-hydroxyquinoline, any of the desirable salts of 8-hydroxyquinoline, such as 8-hydroxyquinoline sulphate. When any such salt is used, a larger quantity of the salt must be added to the composition, said quantity being such as to provide sufficient 8-hydroxyquinoline to come within the ranges stated herein.

Our use of petrolatum may range between 26 to 51 percent out of a total of 100 percent of the composition.

Our use of mineral oil may vary from a low of 10 to a high of 20 out of the total of 100 percent of the composition.

Our use of karaya gum may extend from a low of 35 to a high of 60 percent of a total of 100 percent of the composition.

Harmless red color may be used to agree with the color of the mouth and gums, and the trace of flavor which may be peppermint, spearmint, cinnamon or other well accepted and liked flavor, may be omitted without departing from the spirit of our invention.

In our composition, the base is formed with petrolatum, karaya gum and mineral oil. This provides a base with sufficient adhesive properties and with a desirable texture, consistency and viscosity. When the 8-hydroxyquinoline is added, our composition has not only adhesive but antiseptic, germicidal and deodorizing properties. Color and taste factors may be added to the product for commercial appeal. Our composition is in semi-solid paste form and may be easily spread on the dental plates or other dentures by suitable means.

Having thus described our invention, we claim:

1. An antiseptic and germicidal dental plate adhesive composition consisting substantially of 0.2 percent of 8-hydroxyquinoline, 36 percent of petrolatum U. S. P., 12.5 parts of mineral oil U. S. P., 1.5 parts of harmless red color, 48.8 percent of karaya gum, and a trace of a palatable flavor.

2. An antiseptic and germicidal dental plate adhesive consisting substantially of .033 to 3 percent of 8-hydroxyquinoline, 26 to 51 percent of petrolatum U. S. P., 10 to 20 parts of mineral oil U. S. P., and from 35 to 60 percent of karaya gum.

CLIFFORD J. HEATH.
CARL A. LAWRENCE.
HUGO R. KOLAR.

REFERENCES CITED

The following references are of record in the file of this patent:

UNITED STATES PATENTS

| Number | Name | Date |
|---|---|---|
| 1,920,639 | Haraldson | July 8, 1930 |
| 2,021,137 | Stone | Nov. 19, 1935 |
| 2,439,460 | Engler | Apr. 13, 1948 |

OTHER REFERENCES

Lesser: "The Drug and Cosmetic Ind.," 52, 43–46, January 1943.